United States Patent
Yoshida (10) Patent No.: US 10,471,997 B2
(45) Date of Patent: Nov. 12, 2019

(54) VEHICULAR TRUNK LID PANEL

(71) Applicant: Kobe Steel, Ltd., Kobe-shi (JP)

(72) Inventor: Masatoshi Yoshida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 49 days.

(21) Appl. No.: 15/928,201

(22) Filed: Mar. 22, 2018

(65) Prior Publication Data
US 2018/0281870 A1 Oct. 4, 2018

(30) Foreign Application Priority Data
Mar. 29, 2017 (JP) ................. 2017-064966

(51) Int. Cl.
*B62D 25/10* (2006.01)
*B62D 25/12* (2006.01)
*B62D 27/02* (2006.01)
*B62D 29/00* (2006.01)

(52) U.S. Cl.
CPC .......... *B62D 25/105* (2013.01); *B62D 25/12* (2013.01); *B62D 27/026* (2013.01); *B62D 29/008* (2013.01)

(58) Field of Classification Search
CPC .. B62D 25/105; B62D 27/026; B62D 29/008; B62D 25/12
See application file for complete search history.

(56) References Cited

U.S. PATENT DOCUMENTS 7,597,378 B2 10/2009 Ichinose et al.

FOREIGN PATENT DOCUMENTS

JP 2009-29290 2/2009

*Primary Examiner* — D Glenn Dayoan
*Assistant Examiner* — Melissa A Black
(74) *Attorney, Agent, or Firm* — Oblon, McClelland, Maier & Neustadt, L.L.P.

(57) ABSTRACT

A vehicular trunk lid panel includes an inner panel that includes an inner upper surface section and an inner rear surface section, an outer panel that includes an outer upper surface section and an outer rear surface section, and a plurality of adhesive members, in which the inner upper surface section includes a plurality of beads, each bead includes a support section that supports the adhesive members, each adhesive member is arranged on the support section so as to be arrayed intermittently along a predetermined direction, and a support section interval between the support sections adjacent to each other with respect to a crossing direction is smaller than an adhesive member interval between the adhesive members adjacent to each other on each of the support sections.

8 Claims, 10 Drawing Sheets

| case | PLATE THICKNESS t1 (mm) | INDEX VALUE D/t1 | RADIUS OF CURVATURE R(mm) | RIGIDITY VALUE P/S(N/mm) |
|---|---|---|---|---|
| 1 | 1.0 | 100.0 | 3000.0 | 85.3 |
| 2 | 0.7 | 142.9 | 3000.0 | 48.7 |
| 3 | 1.2 | 83.3 | 3000.0 | 139.5 |
| 4 | 1.0 | 150.0 | 3000.0 | 40.6 |
| 5 | 1.0 | 200.0 | 3000.0 | 20.6 |
| 6 | 0.7 | 214.3 | 3000.0 | 27.8 |
| 7 | 1.2 | 166.7 | 3000.0 | 31.8 |
| 8 | 1.0 | 100.0 | 3000.0 | 82.0 |
| 9 | 1.0 | 100.0 | 3000.0 | 84.8 |
| 10 | 0.7 | 285.7 | 3000.0 | 13.8 |
| 11 | 1.2 | 125.0 | 3000.0 | 62.0 |
| 12 | 1.0 | 50.0 | 3000.0 | 320.9 |
| 13 | 0.7 | 71.4 | 3000.0 | 128.2 |
| 14 | 1.0 | 50.0 | 3000.0 | 310.9 |
| 15 | 1.0 | 150.0 | 3000.0 | 39.7 |
| 16 | 0.7 | 142.9 | 3000.0 | 45.2 |
| 17 | 1.2 | 83.3 | 3000.0 | 138.1 |
| 18 | 1.0 | 100.0 | 8000.0 | 93.5 |
| 19 | 1.0 | 150.0 | 8000.0 | 49.2 |
| 20 | 1.0 | 200.0 | 8000.0 | 29.8 |

VEHICULAR TRUNK LID PANEL

FIELD OF INVENTION

The present invention relates to a vehicular trunk lid panel including an upper surface section that covers a trunk room from above and a rear surface section that covers the trunk room from the rear.

BACKGROUND OF INVENTION

In the past, as the vehicular trunk lid panel including an upper surface section and a rear surface section, those including an inner panel and an outer panel are known. For example, in JP-A No. 2009-029290, a trunk lid panel includes an inner panel and an outer panel. The inner panel includes an inner upper surface section and an inner rear surface section, and the inner upper surface section covers a trunk room from above and the inner rear surface section covers the trunk room from the rear. The outer panel includes an outer upper surface section and an outer rear surface section, and the outer upper surface section covers the inner upper surface section from above and the outer rear surface section covers the inner rear surface section from the rear. A pair of left and right beads and a hinge side bead are formed in the inner panel. Respective left and right beads extend so as to connect the corner sections on the front side of the inner upper surface section and the center of the lower end section of the inner rear surface section to each other. The hinge side bead extends so as to connect the front end sections of respective left and right beads to each other. These beads contribute to ensuring the rigidity of the trunk lid panel. Also, the portions facing the outer panel out of respective beads are connected to the outer panel by adhesive members.

In such a vehicular trunk lid panel as described in JP-A No. 2009-029290, the tensile rigidity and the torsional rigidity in the upper surface section are required particularly. On the other hand, in the trunk lid panel described above, there is a room for improvement of the tensile rigidity and the torsional rigidity in the upper surface section.

SUMMARY OF INVENTION

The object of the present invention is to provide a vehicular trunk lid panel capable of ensuring the tensile rigidity and the torsional rigidity in the upper surface section.

As a result of the intensive study for solving the problem described above, the present inventors found out that: the torsional rigidity in the upper surface section of the trunk lid panel was largely affected by the torsional rigidity of the inner upper surface section that was the upper surface section of the inner panel; and, in order to improve the torsional rigidity of the upper surface section, it was effective to form plurality of beads in the inner upper surface section so that each bead has a shape of extending along a predetermined direction and the beads are arrayed intermittently side by side along a crossing direction that crossed the predetermined direction.

Also, it was found out that the adhesive members arranged on the portion facing the outer panel out of respective beads of the inner panel had a function of supporting the outer panel from below, and that this support contributed to improvement of the rigidity of the outer panel. Further, because a comparatively large space existed between the bottom surface of the inner panel and the portion positioned above the position between the adjacent beads out of the outer panel, the rigidity of this portion became lower compared to the rigidity of portions supported by the adhesive members out of the outer panel. However, the present inventors conceived that: the rigidity of the portion positioned above the position between the beads could be ensured effectively by narrowing the interval between the adhesive members that were adjacent to each other with respect to the arraying direction of each bead, namely, by narrowing the interval between the adjacent beads; and the tensile rigidity of the outer panel could be thereby improved.

The present invention has been achieved based on such a viewpoint. In concrete terms, the present invention provides a vehicular trunk lid panel covering a trunk room that is arranged behind a cabin of the vehicle including an inner panel that includes an inner upper surface section and an inner rear surface section, the inner upper surface section covering the trunk room from above, the inner rear surface section covering the trunk room from the rear, an outer panel that includes an outer upper surface section and an outer rear surface section, the outer upper surface section covering the inner upper surface section from above, the outer rear surface section covering the inner rear surface section from the rear, and a plurality of adhesive members that connect the outer panel and the inner panel to each other, in which the inner upper surface section includes a plurality of beads that have such a shape that each of the beads extends along a predetermined direction and that are arrayed intermittently side by side with respect to a crossing direction that crosses the predetermined direction, each bead includes a support section that has a shape of extending along the predetermined direction and supports the adhesive members at positions facing the outer upper surface section, each of the adhesive members is arranged on the support section so as to be arrayed intermittently along the predetermined direction, and a support section interval between the support sections adjacent to each other in the crossing direction is smaller than an adhesive member interval between the adhesive members adjacent to each other on each of the support sections.

According to the present vehicular trunk lid panel, because the torsional rigidity of the inner upper surface section is ensured by the beads and the support section interval is smaller than the adhesive member interval, in addition to the rigidity of the portions positioned above the respective support sections out of the outer upper surface section, the rigidity of the portions positioned over the position between the support sections adjacent to each other out of the outer upper surface section is also effectively ensured.

In this case, it is preferable that the beads have a shape of extending along the vehicle width direction respectively and are arrayed intermittently with respect to the vehicle front-rear direction.

Thus, the torsional rigidity of the inner upper surface section can be ensured efficiently even in a limited space.

Also in this case, it is preferable that the beads include a rearmost line bead that is positioned rearmost with respect to the vehicle front-rear direction and a second rear line bead that is positioned so as to be immediately in front of the rearmost line bead, the inner upper surface section further includes a rearmost line bottom section that is formed between the rearmost line bead and the second rear line bead and has a shape of extending along the vehicle width direction, and the inner rear surface section includes at least one rear surface inner bottom section that has a shape of extending in the vertical direction and continues to the rearmost line bottom section.

Thus, because the bending rigidity of the inner panel increases (such resistance increases that is caused when the inner upper surface section and the inner rear surface section deform so that the angle formed by the inner upper surface section and the inner rear surface section becomes large), while ensuring the torsional rigidity of the inner upper surface section and the tensional rigidity of the outer upper surface section, the bending rigidity that is required for the entire trunk lid panel is also ensured effectively.

In concrete terms, it is preferable that the second rear line bead has a shape of extending continuously along the vehicle width direction.

Thus, because the inner upper surface section is not divided in the vehicle width direction, the torsional rigidity of the inner upper surface section is ensured.

Also, in the vehicular trunk lid panel, it is preferable that the outer panel is formed of aluminum or aluminum alloy, the outer upper surface section includes an adhering region between a portion positioned above a very front bead that is positioned at very front with respect to the vehicle front-rear direction out of the beads and a portion positioned above the rearmost line bead, and an index value expressed by a rate of the adhesive member interval in the adhering region with respect to the thickness of the outer upper surface section is 175 to 235.

Thus, the rigidity required for the adhering region of the outer upper surface section can be effectively ensured while avoiding extreme cost increase. In concrete terms, because the index value is 175 or more, increase of the adhering cost (due to increase of the tact time) caused by that the adhesive member interval in the adhering region becomes too small (the amount of the adhesive members becomes too much) is suppressed, or increase of the cost of the outer panel caused by that the plate thickness of the outer upper surface section becomes too thick is suppressed. On the other hand, because the index value is 235 or less, the adhesive member interval in the adhering region namely the interval of the support point that supports the adhering region becomes a proper value with respect to the plate thickness of the outer upper surface section, and therefore the rigidity of the adhering region is effectively ensured.

Also, because the rigidity value of the outer upper surface section (the value obtained by dividing the load applied to the outer upper surface section by the displacement amount of the outer upper surface section generated when the load is applied) becomes 18 N/mm to 30 N/mm, the rigidity required for the outer upper surface section is ensured more securely. The value of this tensional rigidity is similar to the tensional rigidity of the outer upper surface section of the vehicular trunk lid panel made of a steel plate used from the past, and has a level of fully satisfying the performance as a vehicle. Also, because the adhesive member interval is set to a proper value, the plate thickness of the outer panel of the vehicular trunk lid panel formed of aluminum or aluminum alloy can be made thinner than the conventional minimum value 0.9 mm.

Also, in the vehicular trunk lid panel, it is preferable that each adhesive member disposed on a predetermined support section out of the support sections and each adhesive member disposed on a support section that is adjacent to the predetermined support section with respect to the crossing direction are disposed so as to form a zigzag shape.

Thus, the rigidity of the portion positioned above the position between the support sections adjacent to each other out of the outer upper surface section is ensured more effectively.

Also, in the vehicular trunk lid panel, it is preferable that an edge part of the outer panel configures a folding sandwich section that sandwiches an edge part of the inner panel from both sides of the thickness direction of the inner panel in a state of being folded inward, and the thickness of the inner panel is 0.8 times or more of the thickness of the outer panel.

Thus, breakage of the folding sandwich section of the outer panel is suppressed. In concrete terms, because the thickness of the inner panel is 0.8 times or more of the thickness of the outer panel, excessive deformation of the edge part of the outer panel in effecting the bend forming of folding the edge part of the outer panel inward so as to sandwich the edge part of the inner panel is suppressed; and therefore breakage of the folding sandwich section is suppressed.

In this case, it is preferable that the thickness of the inner panel is 1.1 times or less of the thickness of the outer panel.

Thus, weight increase of the inner panel and cost increase accompanying it are avoided.

As described above, according to the present invention, it is possible to provide a vehicular trunk lid panel capable of ensuring the tensile rigidity and the torsional rigidity in the upper surface section.

DESCRIPTION OF EMBODIMENTS

A vehicular trunk lid panel 1 of an embodiment of the present invention will be explained referring to FIG. 1-FIG. 6.

Figure 1:
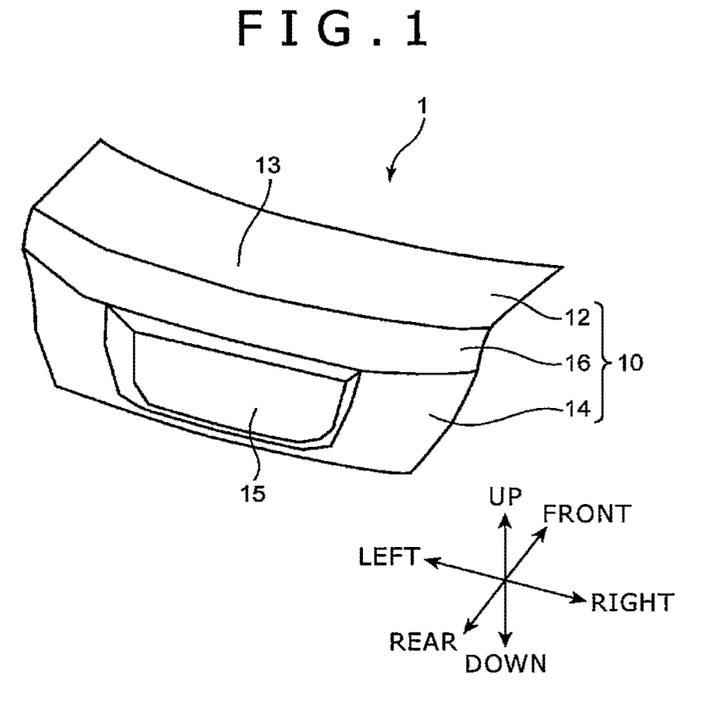
FIG. 1 is a schematic view of a vehicular trunk lid panel of an embodiment of the present invention.

The present vehicular trunk lid panel 1 includes an outer panel 10, an inner panel 20 that is disposed below the outer panel 10, and a plurality of adhesive members 70 that connect the outer panel 10 and the inner panel 20 to each other. The inner panel 20 includes an inner upper surface section 30 and an inner rear surface section 50, and the inner upper surface section 30 covers a trunk room arranged behind a cabin of a vehicle from above and the inner rear surface section 50 covers the trunk room from the rear. The outer panel 10 includes an outer upper surface section 12 and an outer rear surface section 14, and the outer upper surface section 12 covers the inner upper surface section 30 from above and the outer rear surface section 14 covers the inner rear surface section 50 from the rear. The respective adhesive members 70 make the inner upper surface section 30 and the outer upper surface section 12 adhere to each other. According to the present embodiment, the outer panel 10 and the inner panel 20 are formed into a shape symmetric in the vehicle width direction across a plane that passes the center in the vehicle width direction and is orthogonal to the vehicle width direction.

Figure 3:
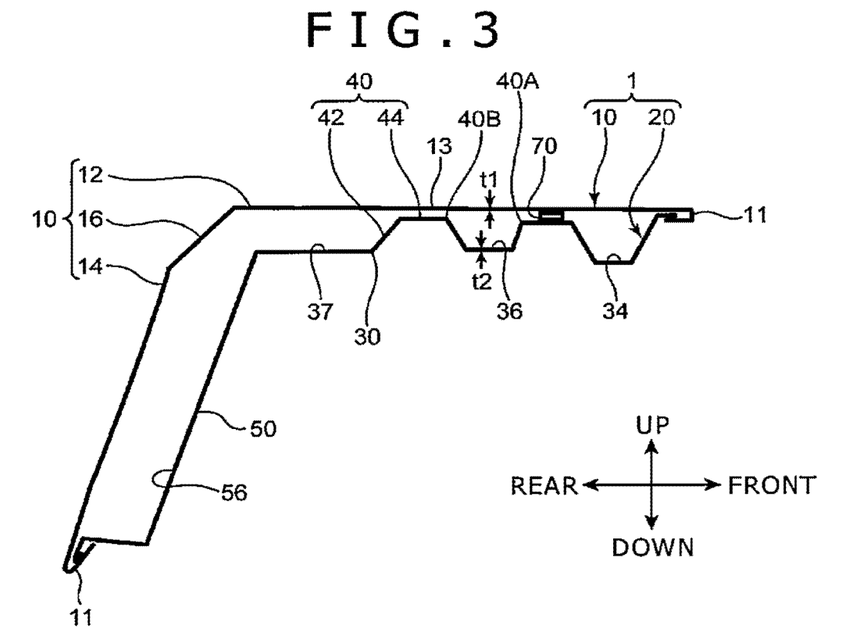
FIG. 3 is a cross-sectional view taken from line illustrated in FIG. 2.
Figure 4:
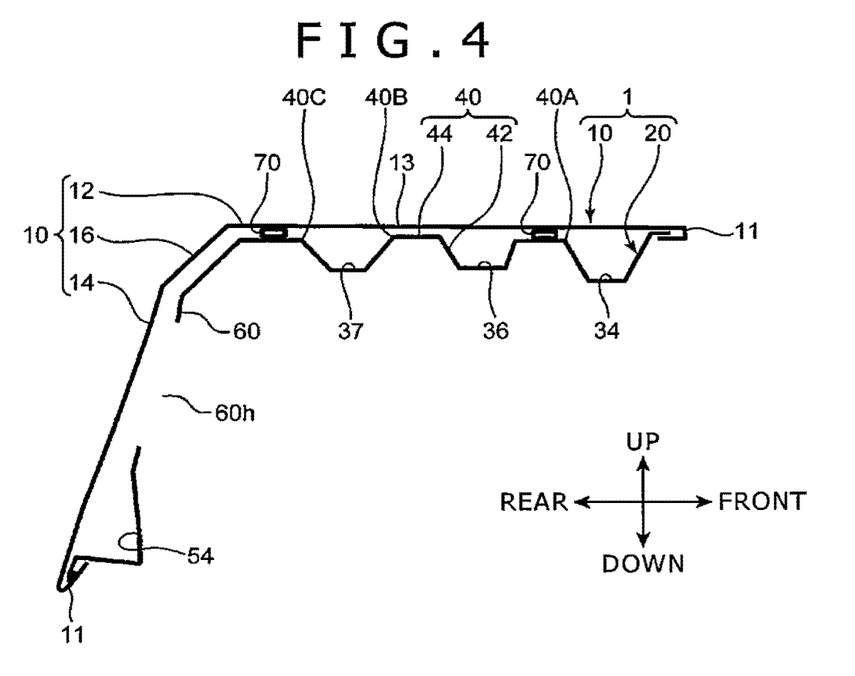
FIG. 4 is a cross-sectional view taken from line IV-IV illustrated in FIG. 2.
Figure 5:
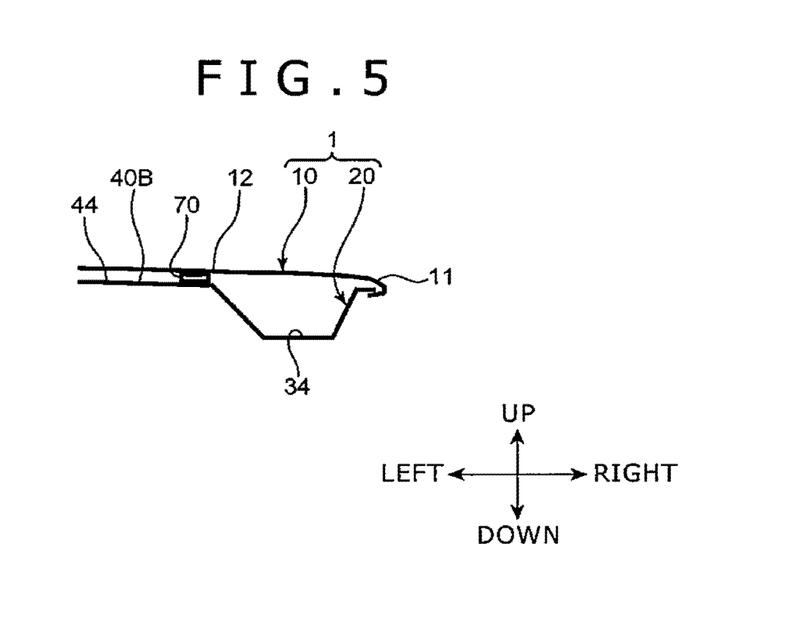
FIG. 5 is a cross-sectional view taken from line V-V illustrated in FIG. 2.

As illustrated in FIG. 1, the outer panel 10 includes a connecting section 16 that connects the outer upper surface section 12 and the outer rear surface section 14 to each other. The connecting section 16 has a shape that curves so as to be convex outward. Also, a license seat 15 is formed in the outer rear surface section 14. In the present embodiment, the outer panel 10 is formed of aluminum or aluminum alloy. Also, from the viewpoint of the dent resistance, it is preferable that the outer panel 10 is formed of 6000 series aluminum alloy. As illustrated in FIG. 3-FIG. 5, the edge part of the outer panel 10 configures a folding sandwich section 11 that sandwiches the edge part of the inner panel 20 from both sides in the thickness direction of the inner panel 20 in a state of being folded inward (to the inner panel 20 side). Also, the folding sandwich section 11 is formed by that the edge part of the outer panel 10 is subjected to folding work (so-called hemming work) inward.

Figure 2:
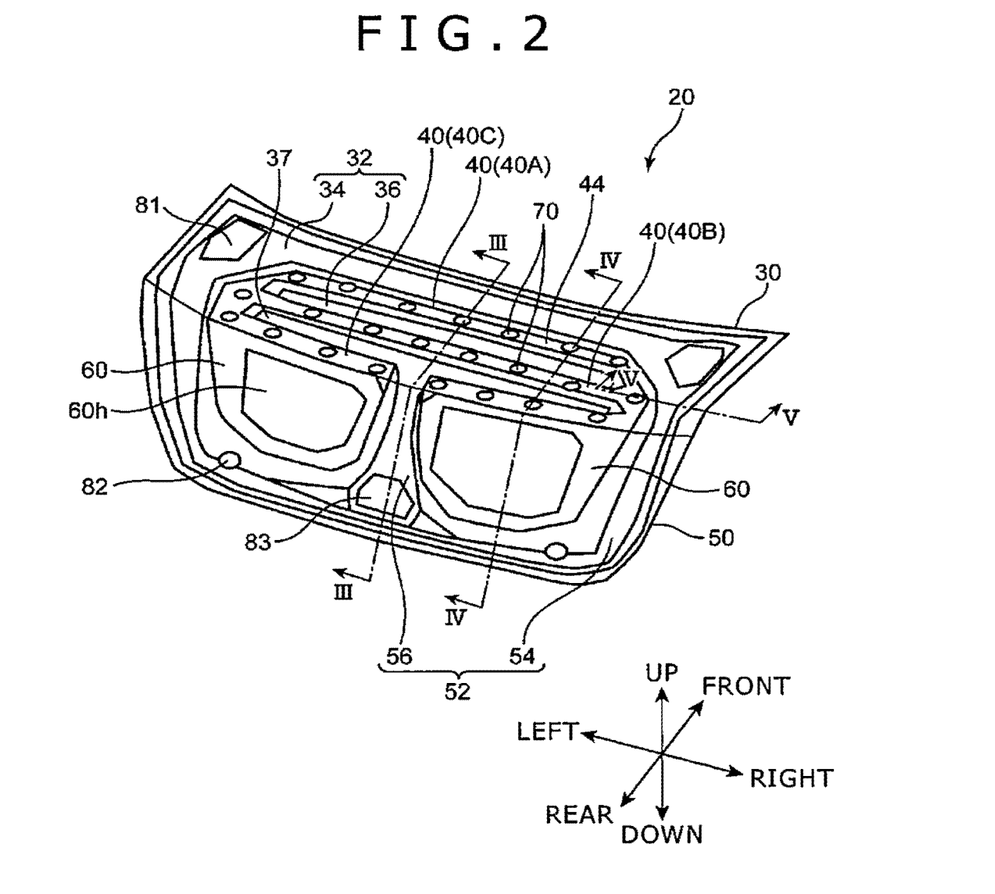
FIG. 2 is a schematic view of an inner panel.

The inner panel 20 is formed of aluminum or aluminum alloy. As illustrated in FIG. 2, the inner upper surface section 30 includes an upper surface bottom section 32 and a plurality of (3 pieces in the present embodiment) beads 40. The inner rear surface section 50 includes a rear surface bottom section 52 and raised sections 60. The upper surface bottom section 32, beads 40, rear surface bottom section 52, and raised sections 60 are formed by subjecting plate material formed of aluminum or aluminum alloy to press forming. Desirably, the rate t2/t1 of the thickness t2 of the inner panel 20 (refer to FIG. 3) with respect to the thickness t1 of the outer panel 10 (refer to FIG. 3) is set to 0.8 to 1.1 approximately.

The upper surface bottom section 32 includes an upper surface outer bottom section 34 and an upper surface inner bottom section 36. The upper surface outer bottom section 34 is arranged at the outer peripheral part of the inner upper surface section 30. At each corner on the front side of the upper surface outer bottom section 34, hinge reinforcement members 81 are arranged which are for fixing hinges that connect the vehicular trunk lid panel 1 to the vehicle body. The upper surface inner bottom section 36 is arranged on the inner side of the upper surface outer bottom section 34.

The beads 40 have such a shape that respective beads extend along the predetermined direction, and are arrayed intermittently side by side along a crossing direction that crosses the predetermined direction. According to the present embodiment, the beads 40 are disposed so that respective beads 40 extend along the vehicle width direction and are arranged intermittently along the vehicle front-rear direction. Therefore, the number the beads becomes less compared to the case of a shape in which each bead extends along the vehicle front-rear direction. Accordingly, the upper surface bottom section 32 can be made deep while effectively avoiding breakage and the like in press forming. Each bead 40 includes inclined walls 42 that stand from the upper surface bottom section 32 toward the outer upper surface section 12, and a support section 44 that is connected to the upper ends of the inclined walls 42.

The inclined wall 42 has a shape of inclining toward the front side or the rear side of the vehicle as it goes upward from the upper surface bottom section 32.

The support section 44 supports the adhesive member 70 at a position facing (a position approaching) the outer upper surface section 12. The support section 44 is formed generally flat. The support section 44 has a shape of extending along the vehicle width direction.

As illustrated in FIG. 2, the beads 40 include a furthest front line bead 40A that is positioned at the furthest front with respect to the vehicle front-rear direction, a last line bead 40C that is positioned at the furthest rear with respect to the vehicle front-rear direction, and a second rear line bead 40B that is positioned immediately in front of the last line bead 40C (between the furthest front line bead 40A and the last line bead 40C in the present embodiment). The furthest front line bead 40A and the second rear line bead 40B have a shape of extending continuously along the vehicle width direction. The last line bead 40C has a shape of extending intermittently along the vehicle width direction. In concrete terms, the last line bead 40C is divided into 2 in the vehicle width direction.

The upper surface inner bottom section 36 is arranged between respective beads 40. In other words, the upper surface inner bottom section 36 has a shape of extending along the vehicle width direction. The upper surface inner bottom section 36 includes a last line bottom section 37 that is formed between the last line bead 40C and the second rear line bead 40B.

The rear surface bottom section 52 includes a rear surface outer bottom section 54 and a rear surface inner bottom section 56.

The rear surface outer bottom section 54 is arranged at the outer peripheral part of the inner rear surface section 50. The upper end of the rear surface outer bottom section 54 continues to the rear end of the upper surface outer bottom section 34. In other words, the upper surface outer bottom section 34 and the rear surface outer bottom section 54 are arranged annularly at the outer peripheral part of the inner panel 20. At the lower part of the rear surface outer bottom section 54, cushion member seats 82 are arranged which are for fixing cushion members such as a cushion rubber.

The rear surface inner bottom section 56 is arranged on the inner side of the rear surface outer bottom section 54. According to the present embodiment, the rear surface inner bottom section 56 has a shape of extending in the vertical direction at the center in the vehicle width direction. The upper end of the rear surface inner bottom section 56 continues to the last line bottom section 37. At the lower part of the rear surface inner bottom section 56, a striker reinforcement member 83 is arranged.

The raised section 60 has a shape of rising rearward from the rear surface bottom section 52. More specifically, the raised section 60 has a shape of rising rearward between the rear surface outer bottom section 54 and the rear surface inner bottom section 56. The upper end of the raised section 60 continues to the support section 44 of the last line bead 40C. A trim hole 60h is formed in the raised section 60.

Figure 6:
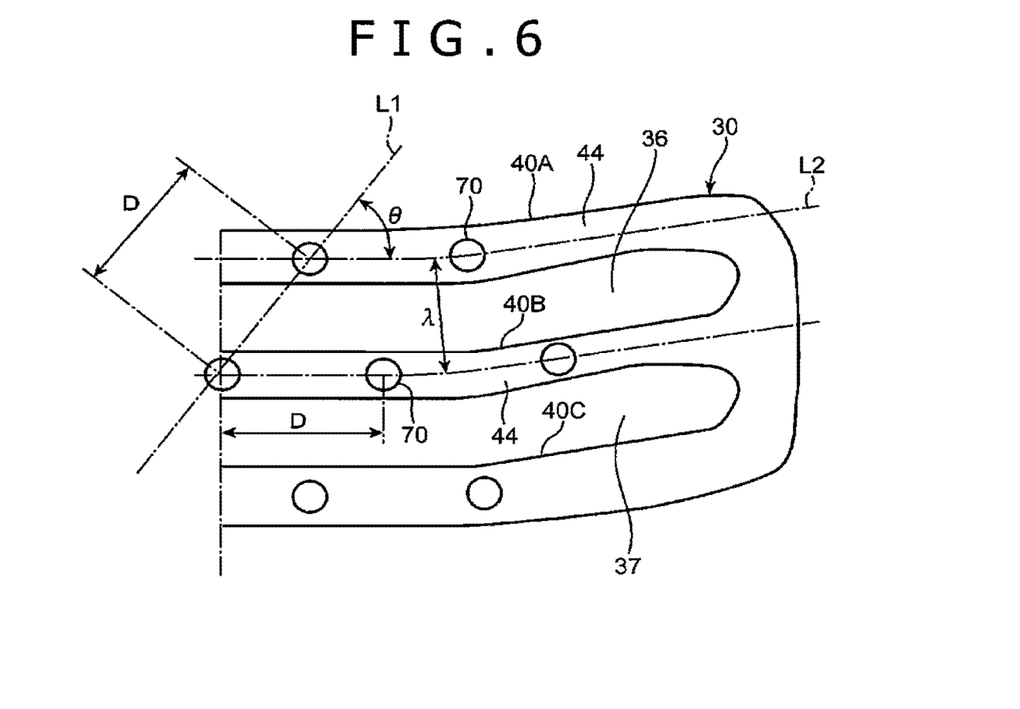
FIG. 6 is a drawing that illustrates the positional relation between the support section of each bead and the adhesive member.

Next, the disposition relation between each bead 40 (40A-40C) and each adhesive member 70 will be explained referring to FIG. 6.

Each adhesive member 70 is arranged on each support section 44, and makes the inner upper surface section 30 and the outer upper surface section 12 adhere to each other. Each adhesive member 70 has a function of supporting the outer upper surface section 12 from below, and this support contributes to improving the rigidity of the outer upper surface section 12. In the present embodiment, a mastic adhesive is used as the adhesive member 70.

Each adhesive member 70 is arranged intermittently along the longitudinal direction of the support section 44. An interval λ between straight lines that pass each center part of the support sections 44 that are adjacent to each other with respect to the vehicle front-rear direction (will be hereinafter referred to as "support section interval λ") is set smaller than an interval D between the adhesive members 70 that are adjacent to each other on each support section 44 (will be hereinafter referred to as "adhesive member interval D"). As illustrated in FIG. 6, each adhesive member 70 disposed on a specific support section 44 (for example the support section 44 of the furthest front line bead 40A) and each adhesive member 70 disposed on the support section 44 that is adjacent to the specific support section 44 (for example the support section 44 of the second rear line bead 40B) are disposed in a zigzag shape (alternately so as not to overlap each other in the vehicle front-rear direction). In the present embodiment, an angle θ formed by a straight line L1 and a straight line L2 is set to 60 degrees substantially. The straight line L1 connects one adhesive member 70 that is disposed on a specific support section 44 and an adhesive member 70 that is disposed at a position nearest to one adhesive member 70 out of the adhesive members 70 that are disposed on the support section 44 adjacent to the specific support section 44. The straight line L2 passes the center part of the specific support section 44 with respect to the vehicle front-rear direction. In other words, 2 adhesive members 70 that are adjacent to each other on the specific support section 44 and one adhesive member 70 that is disposed at a position nearest from both of the 2 adhesive members 70 on the support section 44 adjacent to the specific support section 44 are disposed at positions that become the vertexes of a generally regular triangle. Thus, because the interval of the position of supporting the outer upper surface section 12 by each adhesive member 70 is equalized, the tensile rigidity of the outer upper surface section 12 can be ensured efficiently without increasing the number of pieces of the adhesive member 70.

The outer upper surface section 12 is supported by the inner upper surface section 30 through the adhesive members 70 that are disposed on the respective support sections 44. In other words, the outer upper surface section 12 includes an adhering region 13 that is a region adhering to the adhesive members 70 disposed on the respective support sections 44. In concrete terms, the adhering region 13 means a region between a portion positioned over the furthest front line bead 40A and a portion positioned over the last line bead 40C with respect to the vehicle front-rear direction out of the outer upper surface section 12. An index value D/t1 expressed by the rate of the adhesive member interval D in the adhering region 13 with respect to the thickness t1 of the outer upper surface section 12 is set to 175 to 235. Also, a rate λ/t1 of the support section interval λ in the adhering region 13 with respect to the thickness t1 of the outer upper surface section 12 is set to 100 to 135.

As explained above, the inner upper surface section 30 includes the beads 40 in the vehicular trunk lid panel 1 of the present embodiment, and therefore the torsional rigidity of the inner upper surface section 30 is ensured. In concrete terms, in evaluating the torsional rigidity of the vehicular trunk lid panel 1, a load applied to the outer upper surface section 12 propagates in the vehicle width direction through each bead, and therefore the torsional load is born by the entire vehicular trunk lid panel 1. Accordingly, the torsional rigidity is ensured. Also, because the support section interval λ is smaller than the adhesive member interval D, in addition to the rigidity of a portion positioned on the respective support sections 44 out of the outer upper surface section 12, the rigidity of a portion positioned on the position between the support sections 44 that are adjacent to each other out of the outer upper surface section 12 is also ensured effectively. Therefore, the outer panel 10 can be made thin.

Also, the inner rear surface section 50 includes the rear surface inner bottom section 56, and the upper end of this rear surface inner bottom section 56 continues to the last line bottom section 37. Therefore, the bending rigidity of the inner panel 20 increases (the resistance of the time when the inner upper surface section 30 and the inner rear surface section 50 deform so that the angle formed by the inner upper surface section 30 and the inner rear surface section 50 becomes large increases). Accordingly, while ensuring the torsional rigidity of the inner upper surface section 30 and the tensile rigidity of the outer upper surface section 12, the bending rigidity required for the entire vehicular trunk lid panel 1 is also ensured effectively.

Furthermore, because the second rear line bead 40B has a shape of extending continuously along the vehicle width direction, namely because all beads 40 are not divided in the vehicle width direction by the upper surface inner bottom section 36, the torsional rigidity of the inner upper surface section 30 is ensured.

Also, the index value D/t1 expressed by the rate of the adhesive member interval D in the adhering region 13 with respect to the thickness t1 of the outer upper surface section 12 is set to 175 to 235. Therefore, the rigidity required for the adhering region 13 of the outer upper surface section 12 can be effectively ensured while avoiding extreme cost increase. In concrete terms, because the index value D/t1 is 175 or more, increase of the adhering cost (due to increase of the tact time) caused by that the adhesive member interval D in the adhering region 13 becomes too small (the amount of the adhesive members 70 becomes too much) or increase of the cost of the outer panel 10 caused by that the thickness t1 of the outer upper surface section 12 becomes too thick is suppressed. On the other hand, because the index value D/t1 is 235 or less, the adhesive member interval D in the adhering region 13 namely the interval of the support point that supports the adhering region 13 becomes a proper value with respect to the thickness t1 of the outer upper surface section 12, and therefore the rigidity of the adhering region 13 is effectively ensured.

Also, because the rigidity value of the outer upper surface section 12 (the value obtained by dividing the load applied to the outer upper surface section 12 by the displacement of the outer upper surface section 12 generated when the load is applied) becomes 18 N/mm to 30 N/mm, the rigidity required for the outer upper surface section 12 is ensured more securely. This tensional rigidity is similar to the tensional rigidity of an outer upper surface section of a vehicular trunk lid panel made of a steel plate used from the past, and has a level of fully satisfying the performance as a vehicle. Also, because the adhesive member interval D is set to a proper value, the plate thickness of the outer panel of the vehicular trunk lid panel formed of aluminum or aluminum alloy can be made thinner than the conventional minimum value 0.9 mm.

Also, because the thickness t2 of the inner panel 20 is 0.8 times or more of the thickness t1 of the outer panel 10, breakage of the folding sandwich section 11 of the outer panel 10 is suppressed. In concrete terms, because the thickness t2 of the inner panel 20 is 0.8 times or more of the thickness t1 of the outer panel 10, excessive deformation of the edge part of the outer panel 10 in effecting the bend forming of folding the edge part of the outer panel 10 inward so as to sandwich the edge part of the inner panel 20 is suppressed, and therefore breakage of the folding sandwich section 11 is suppressed.

Also, because the thickness t2 of the inner panel 20 is 1.1 times or less of the thickness t1 of the outer panel 10, weight increase of the inner panel 20 and cost increase accompanying it are avoided.

Further, the embodiment disclosed this time is to be deemed to be exemplification and not to be limitative in all respects. The scope of the present invention is expressed not by explanation of the embodiment described above but by the claims, and includes all alterations within the meaning and the scope same to those of the claims.

Figure 7:
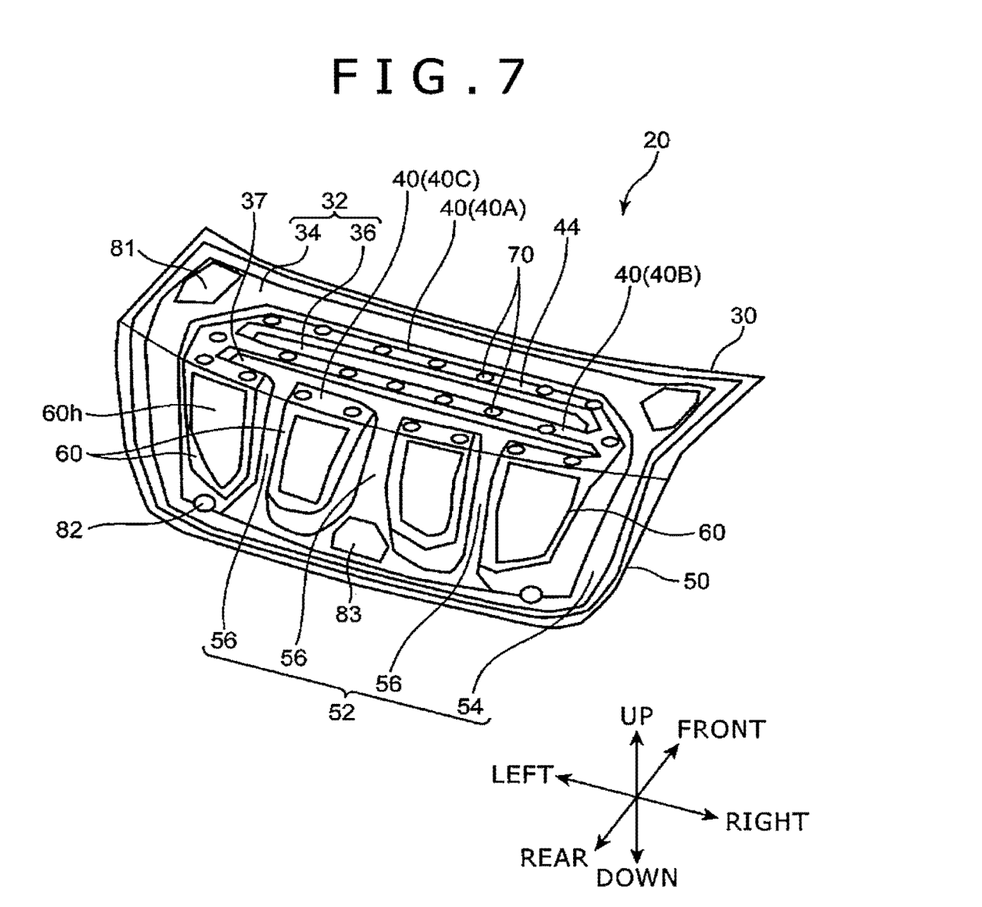
FIG. 7 is a schematic view of a modification of an inner panel.
Figure 8:
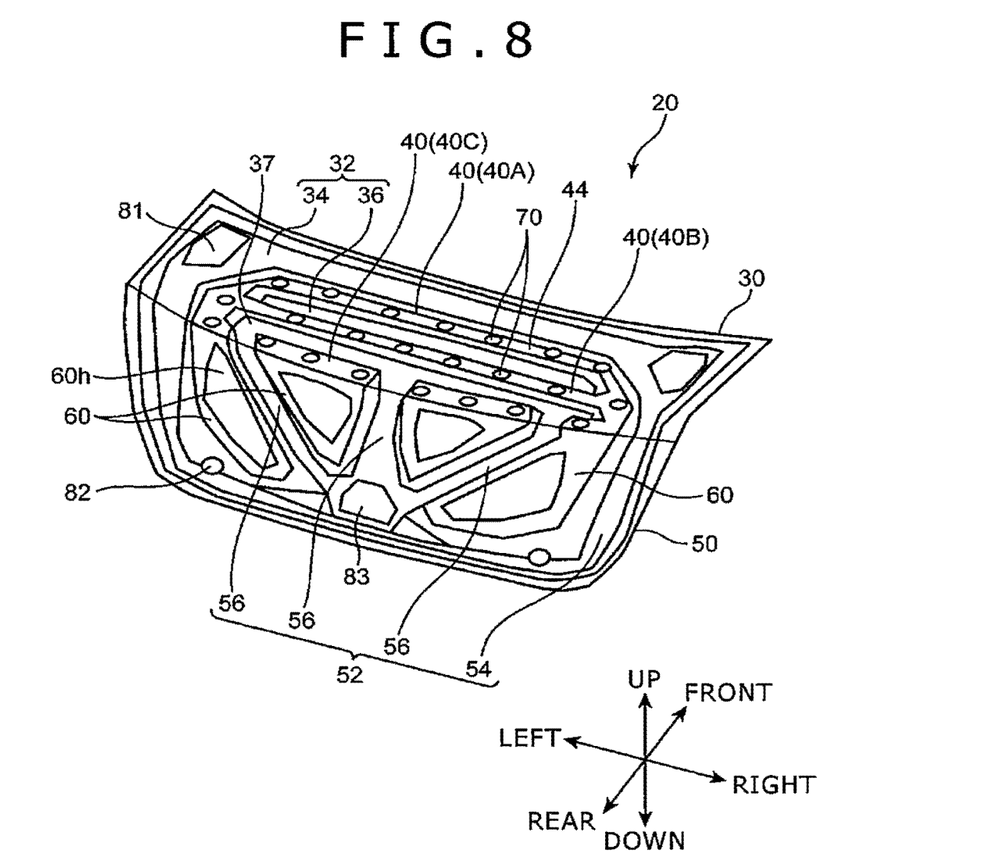
FIG. 8 is a schematic view of a modification of an inner panel.
Figure 9:
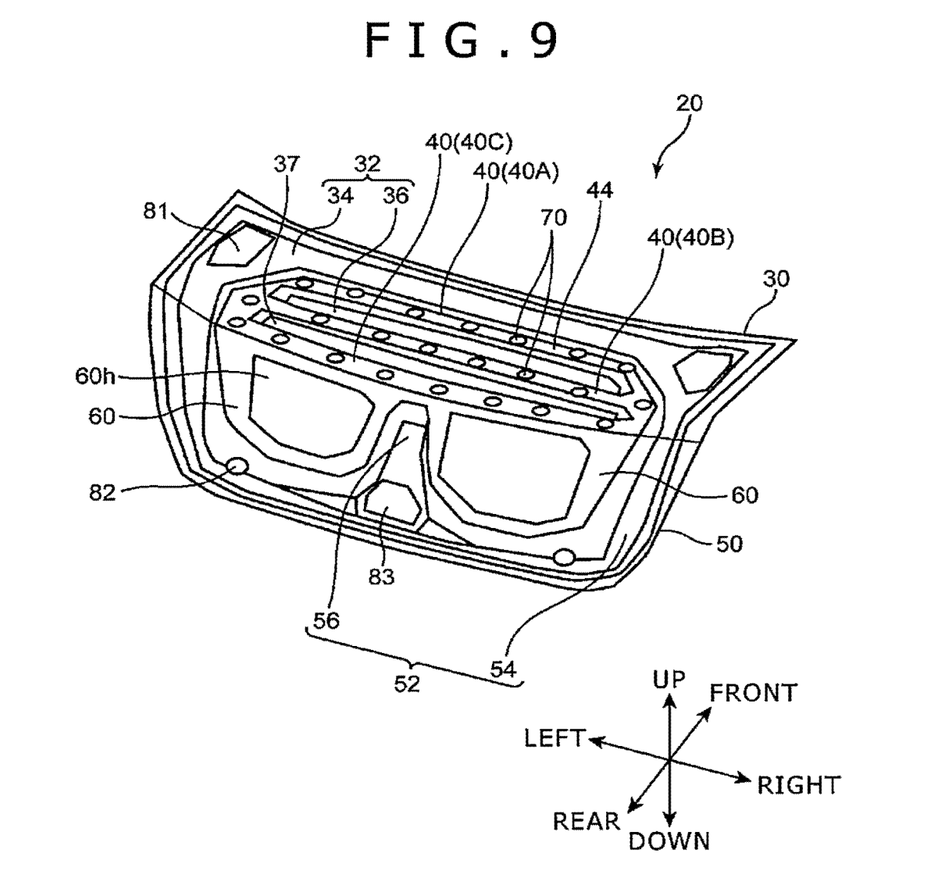
FIG. 9 is a schematic view of a modification of an inner panel.

For example, the inner rear surface section 50 may include a plurality of rear surface inner bottom sections 56 that are arranged at positions apart from each other in the vehicle width direction, and a plurality of rising sections 60 that are formed between the respective rear surface inner bottom sections 56 as illustrated in FIG. 7 and FIG. 8. According to this aspect, because the rear surface inner bottom sections 56 continue to the last line bottom section 37 at a plurality of positions, the bending rigidity of the inner panel 20 increases more, compared to the case in which the rear surface inner bottom section 56 continues to the last line bottom section 37 at one position as the embodiment described above. Also, as illustrated in FIG. 9, the upper end of the rear surface inner bottom section 56 may not continue to the last line bottom section 37.

Further, each bead 40 may have a shape of extending along the vehicle front-rear direction or a direction that crosses both of the vehicle width direction and the vehicle front-rear direction, instead of a shape of extending along the vehicle width direction.

EXAMPLE

Next, an example of the embodiment described above (an evaluation test for the torsional rigidity of the outer upper surface section 12) will be explained referring to FIG. 10-FIG. 14.

Figure 10:
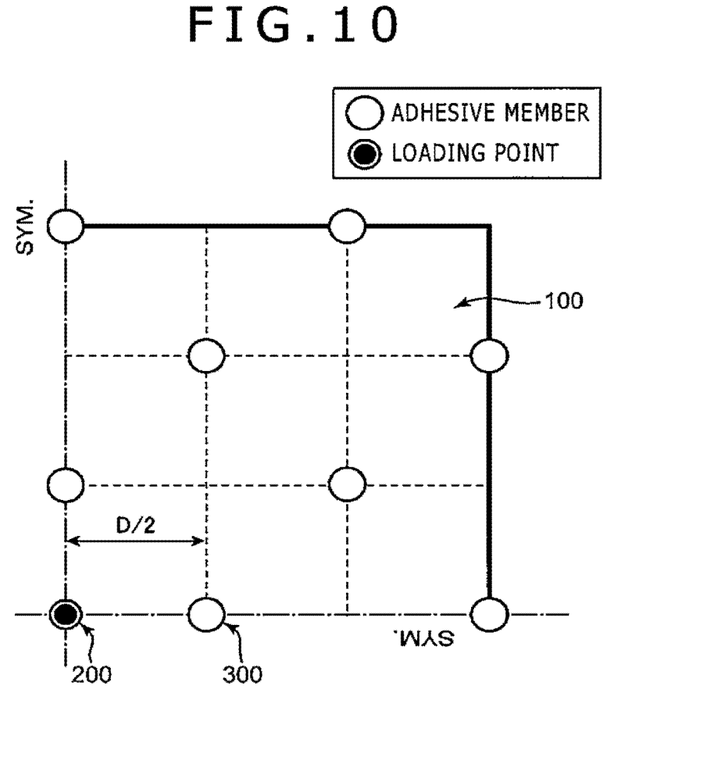
FIG. 10 is a plan view that illustrates a disposal example of a spring member simulating the adhesive member with respect to a test panel simulating the outer panel.
Figure 11:
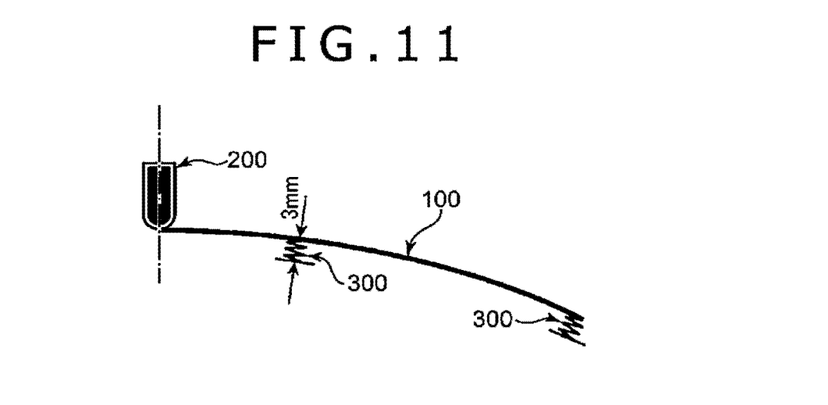
FIG. 11 is a front view of the drawing illustrated in FIG. 10.

In this example, evaluation by the CAE analysis was executed using a test panel 100 simulating the outer upper surface section 12 of the embodiment described above and spring members 300 simulating the adhesive members 70. As illustrated in FIG. 10 and FIG. 11, the test panel 100 is obtained by modeling a part of the outer upper surface section 12 with a condition of covering ¼ of an object, and has a shape of curving so as to have a predetermined radius of curvature. The spring members 300 are disposed between the back surface of the test panel 100 and a rigid body that is arranged at a position apart from the back surface by 3 mm, and the spring constant of them is 70 kN/mm. Also, it is confirmed that the spring constant of the adhesive member 70 does not affect the tensile rigidity of the outer upper surface section 12.

The tensile rigidity was evaluated by the CAE analysis based on the displacement amount S of the center part of test panel 100 when a load P was applied to the center part of the test panel 100 by a tool 200 that had a spherical head part with 12 mm diameter. The load P was 98 N. This analysis was executed for the cases the adhesive member interval D illustrated in FIG. 10 was 100 mm, 150 mm, and 200 mm.

Figure 12:
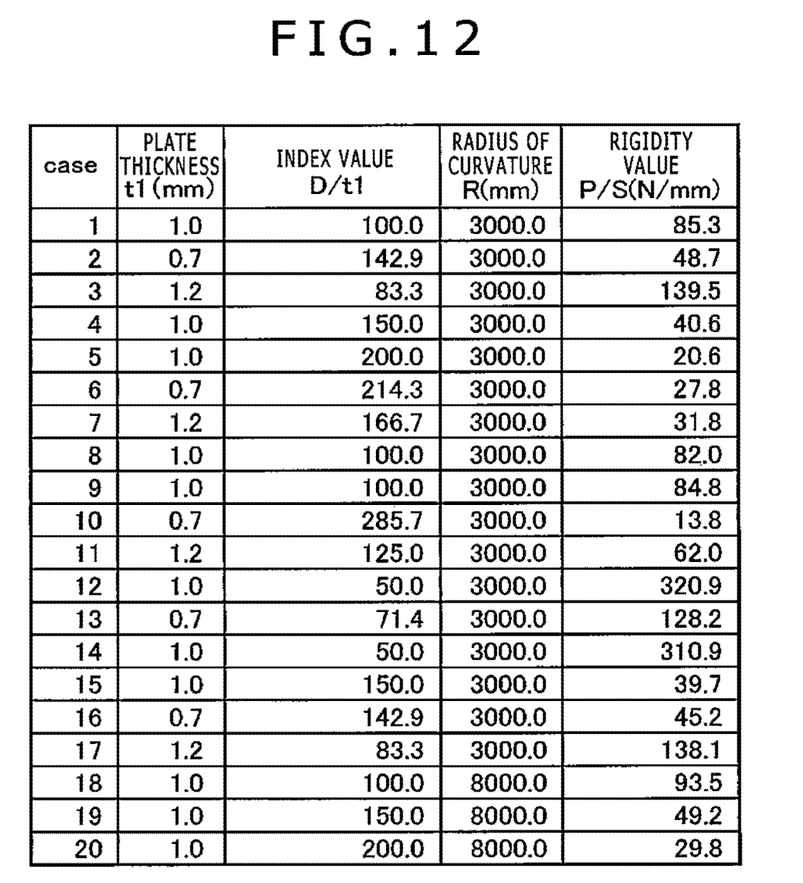
FIG. 12 is a table that shows the evaluation result of the tensile rigidity.
Figure 13:
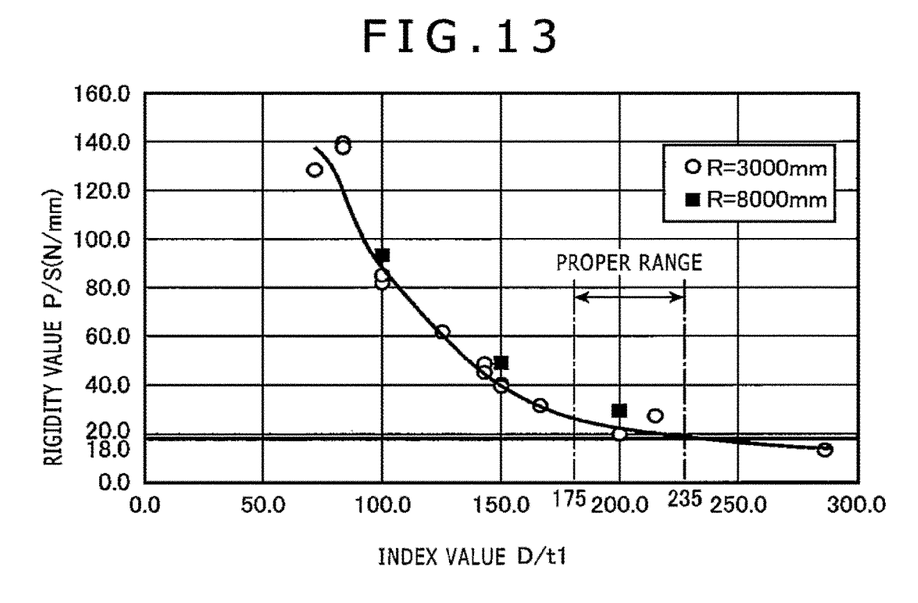
FIG. 13 is a graph that illustrates the relation between the index value D/t1 and the rigidity value P/S.

The evaluation result is illustrated in FIG. 12, and the relation between the index value D/t1 and the rigidity value P/S (the value obtained by dividing the load P applied to the test panel 100 by the displacement value S of the test panel 100 generated in applying the load P) is illustrated in FIG. 13. From this evaluation analysis result, the present inventors found out that the rigidity value P/S of the panel component was determined with respect to the index value D/t1 generally unambiguously. The rigidity value P/S is preferably 18 N/mm to 30 N/mm, more preferably 18 N/mm. From FIG. 13, it is known that the index value D/t1 when the rigidity value P/S becomes 18 N/mm to 30 N/mm is 175 to 235, and that the index value D/t1 when the rigidity value P/S becomes 18 N/mm is 200.

Figure 14:
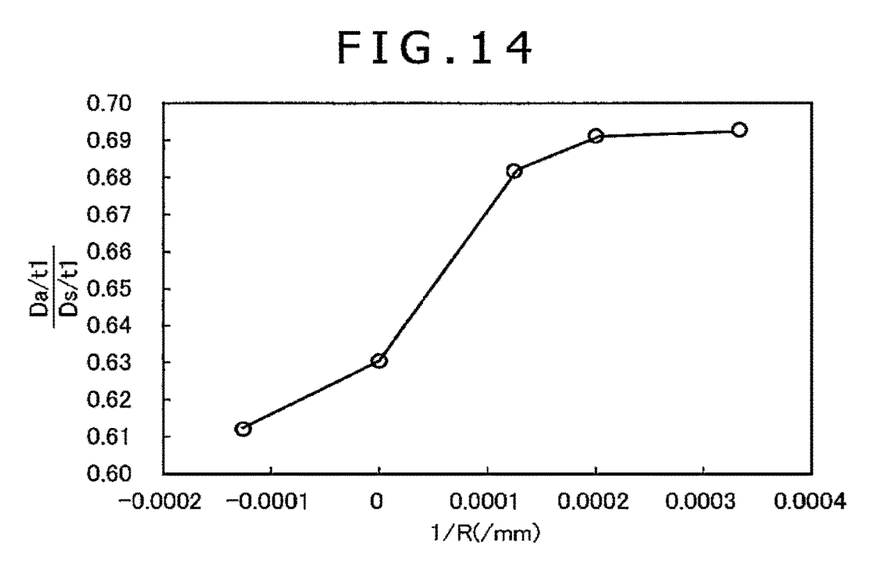
FIG. 14 is a drawing that illustrates the relation between the curvature of the outer upper surface section and the ratio of the aluminum index value Da/t1 and the steel plate index value Ds/t1.

FIG. 14 is a graph that illustrates the relation between the curvature of the outer upper surface section 12 and the ratio of the index value D/t1 in the outer panel formed of aluminum alloy (will be hereinafter expressed as "aluminum index value Da/t1") to the index value D/t1 in the outer panel formed of a steel plate (will be hereinafter expressed as "steel plate index value Ds/t1"). The target value of the steel plate index value Ds/t1 is 285 to 335. From FIG. 14, it is known that the aluminum index value Da/t1 for obtaining a value similar to the steel plate index value Ds/t1 disperses to some extent according to the curvature of the outer upper surface section and is approximately 0.6-0.7 times of the steel plate index value Ds/t1. That is, because the target value of the steel plate index value Ds/t1 is 285 to 335, the suitable range of the aluminum index value Da/t1 becomes 175 to 235 approximately. In other words, by setting the aluminum index value Da/t1 to 175 to 235, the rigidity value P/S becomes 18 N/mm to 30 N/mm, and an outer panel formed of aluminum or aluminum alloy having the tensile rigidity similar to the tensile rigidity of the outer panel formed of a steel plate is obtained.

This application claims priority to Japanese Patent Application No. 2017-064966, filed Mar. 29, 2017, the entirety of which is hereby incorporated by reference.

What is claimed is:

1. A vehicular trunk lid panel covering a trunk room that is arranged behind a cabin of a vehicle, comprising:
   an inner panel that includes an inner upper surface section and an inner rear surface section, the inner upper surface section covering the trunk room from above, the inner rear surface section covering the trunk room from the rear;
   an outer panel that includes an outer upper surface section and an outer rear surface section, the outer upper surface section covering the inner upper surface section from above, the outer rear surface section covering the inner rear surface section from the rear; and
   a plurality of adhesive members that connect the outer panel and the inner panel to each other, wherein
   the inner upper surface section includes a plurality of beads that have such a shape that each of the beads extends along a predetermined direction and that are arrayed intermittently side by side with respect to a crossing direction that crosses the predetermined direction, each bead includes a support section that has a shape of extending along the predetermined direction and supports the adhesive members at positions facing the outer upper surface section, each of the adhesive members is arranged on the support section so as to be arrayed intermittently along the predetermined direction, and a support section interval between the support sections adjacent to each other in the crossing direction is smaller than an adhesive member interval between the adhesive members adjacent to each other on each of the support sections.

2. The vehicular trunk lid panel according to claim 1, wherein the plurality of beads have a shape of extending along the vehicle width direction respectively and are arrayed intermittently with respect to the vehicle front-rear direction.

3. The vehicular trunk lid panel according to claim 2, wherein the plurality of beads include a rearmost line bead that is positioned rearmost with respect to the vehicle front-rear direction and a second rear line bead that is positioned so as to be immediately in front of the rearmost line bead, the inner upper surface section further includes a rearmost line bottom section that is formed between the rearmost line bead and the second rear line bead and has a shape of extending along the vehicle width direction, and the inner rear surface section includes at least one rear surface inner bottom section that has a shape of extending in the vertical direction and continues to the rearmost line bottom section.

4. The vehicular trunk lid panel according to claim 3, wherein the second rear line bead has a shape of extending continuously along the vehicle width direction.

5. The vehicular trunk lid panel according to claim 3, wherein the outer panel is formed of aluminum or aluminum alloy, the outer upper surface section includes an adhering region between a portion positioned above a very front bead that is positioned at very front with respect to the vehicle front-rear direction out of the plurality of beads and a portion positioned above the rearmost line bead, and an index value expressed by a rate of the adhesive member interval in the adhering region with respect to the thickness of the outer upper surface section is 175 to 235.

6. The vehicular trunk lid panel according to claim 1, wherein each adhesive member disposed on a predetermined support section out of the plurality of the support sections and each adhesive member disposed on a support section that is adjacent to the predetermined support section with respect to the crossing direction are disposed so as to form a zigzag shape.

7. The vehicular trunk lid panel according to claim 1, wherein an edge part of the outer panel configures a folding sandwich section that sandwiches an edge part of the inner panel from both sides of the thickness direction of the inner panel in a state of being folded inward, and the thickness of the inner panel is 0.8 times or more of the thickness of the outer panel.

8. The vehicular trunk lid panel according to claim 7, wherein the thickness of the inner panel is 1.1 times or less of the thickness of the outer panel.

* * * * *